United States Patent [19]

Proven

[11] Patent Number: 5,226,805
[45] Date of Patent: Jul. 13, 1993

[54] WINDMILL HAVING BLADES WHICH ALTER THEIR PITCH ANGLES AUTOMATICALLY IN RESPONSE TO BOTH WIND SPEED AND LOAD

[75] Inventor: Gordon Proven, West Kilbride, Great Britain

[73] Assignee: Proven Engineering Products Limited, Kilmarnock, Great Britain

[21] Appl. No.: 916,870

[22] PCT Filed: Feb. 12, 1991

[86] PCT No.: PCT/GB91/00209
§ 371 Date: Aug. 10, 1992
§ 102(e) Date: Aug. 10, 1992

[87] PCT Pub. No.: WO91/12429
PCT Pub. Date: Aug. 22, 1991

[30] Foreign Application Priority Data
Feb. 16, 1990 [GB] United Kingdom ............... 9003591

[51] Int. Cl.$^5$ ........................... F03D 1/06; F03D 7/04
[52] U.S. Cl. ........................... 416/132 A; 416/132 B; 416/135; 416/237; 416/240
[58] Field of Search ........... 416/132 A, 132 B, 135 A, 416/237 B, 240 A

[56] References Cited

U.S. PATENT DOCUMENTS

| | | | |
|---|---|---|---|
| 1,043,830 | 11/1912 | Heath | 416/132 A |
| 2,050,142 | 8/1936 | White | 416/132 B |
| 4,191,506 | 3/1980 | Packham | 416/237 B |
| 4,310,284 | 1/1982 | Randolph | 416/132 B |
| 4,909,703 | 3/1990 | Jacobs | 416/135 |

FOREIGN PATENT DOCUMENTS

| | | | |
|---|---|---|---|
| 868278 | 12/1941 | France. | |
| 2569243 | 2/1986 | France. | |
| 0148978 | 11/1980 | Japan | 416/132 B |
| 8204927 | 7/1984 | Netherlands. | |
| 2169663 | 7/1986 | United Kingdom. | |

*Primary Examiner*—Edward K. Look
*Assistant Examiner*—Christopher M. Verdier
*Attorney, Agent, or Firm*—Ratner & Prestia

[57] ABSTRACT

A windmill includes a hub assembly (13) connected to a shaft (3) and having a plurality of blades (6) extending therefrom. Each blade comprises an inner section (6a) hingeably connected to a hub member (14) along a first axis (8) and an outer section (6b) hingeably connected to the inner portion along a second hinge axis (7) extending from a point on the trailing edge (11) of the blade adjacent the first hinge axis to a point on the leading edge (12) remote from the first hinge axis. The blades are resiliently biased towards a rest position wherein the inner section of each blade lies in a plane at an angle to the plane of rotation of the blades and the outer sections extend outwardly in a plane at an angle to the plane of the inner section and at a pitch angle to the plane of rotation. The configuration is such that the blades vary their pitch angles automatically in response to variations in wind speed and in the torsional load applied to the shaft, decreasing in pitch in response to increasing wind speed and increasing in pitch in response to increasing load.

10 Claims, 3 Drawing Sheets

WINDMILL HAVING BLADES WHICH ALTER THEIR PITCH ANGLES AUTOMATICALLY IN RESPONSE TO BOTH WIND SPEED AND LOAD

BACKGROUND OF THE INVENTION

This invention relates to windmills.

With the depletion of the world's mineral resources alternative sources of energy have become more popular and one of these is wind power. It has been proposed to erect large windmills having wind drive blades connected with generators for producing electricity. However, the large variations in wind speed have necessitated the incorporation of pitch variation for the blades so that a generally constant blade rotation is approximated.

GB-A-2,169,663, in the name of the present applicant, discloses a construction for a windmill blade wherein the blade is connected to a hub by means of an intermediate portion, the intermediate portion being connected to the hub and to the blade by first and second parallel hinges and being itself hinged along a third axis extending diagonally between the parallel hinges. The hub, blade and intermediate portion are moulded integrally from plastics material, the hinges comprising resilient creases in the plastic. In a rest condition, the creases orient the blade at an angle to its plane of rotation and rotation of the blade creates a centrifugal force on the blade which tends to flatten out the hinge creases, thereby reducing the pitch angle of the blade in response to changes in its speed of rotation caused by variations in wind speed.

The blade of GB-A-2,169,663 thus reacts automatically to changes in wind speed by reducing its pitch angle as the wind speed increases and increasing its pitch angle as the wind speed drops. However, it is not responsive to variations in the torsional loading on the shaft which it is driving, i.e. at any given wind speed the pitch angle will not change in response to changes in torque at the shaft.

SUMMARY OF THE INVENTION

It is an object of the present invention to provide a windmill having blades which alter their pitch angles automatically in response to changes in both wind speed and load.

According to the present invention there is provided a windmill including a plurality of windmill blades extending outwardly from and spaced equi-angularly about a central axis of rotation and each having a leading edge and a trailing edge, the blades being connected together at a central hub portion and adapted to rotate about said central axis in a plane of rotation normal to said central axis, each of said blades having an inner section hingeably attached to said hub portion along a first hinge axis and an outer section hingeably connected to said inner portion along a second hinge axis, said second hinge axis extending from a point on the trailing edge of the blade adjacent to the first hinge axis to a point on the leading edge of the blade remote from the first hinge axis, the inner section being resiliently biased towards a rest position wherein it lies in a plane at an angle to the plane of rotation and wherein the outer section is disposed at a pitch angle relative to the plane of rotation, such that force applied to the blade against the bias force tends to reduce the angle between the plane of the inner section and the plane of rotation and the pitch angle of the outer section.

Preferably, said hub portion is attached to a rotatable shaft extending rearwardly from the hub along the axis of rotation, and said inner section of each blade is angled outwardly and rearwardly from the hub when in its rest position.

Preferably also, said inner section of each blade is biased towards its rest position by at least one resilient bias element connected between the hub portion and the inner section.

Preferably also, said hub portion includes an anchoring member spaced from the first hinge axes along the axis of rotation, said at least one resilient bias member of each blade having a first end connected to the anchoring member and a second end connected to the inner section of the blade.

Preferably also, said second end of said at least one resilient member of each blade is attached to a plate member secured to an inner surface of the inner section facing the axis of rotation.

Suitably, said at least one resilient bias member of each blade may be a coil spring.

The inner section of each blade may be generally triangular, a first edge thereof extending along said first hinge axis, a second edge thereof extending along said second hinge axis and a third edge thereof forming part of the leading edge of the blade.

The angle between the first and second hinge axes of the inner section of each blade may be approximately 45°.

Preferably, said inner and outer sections of each blade are formed integrally from plastics material creased along said second hinge axis.

Preferably also, each blade is attached to the hub by means of a flap formed integrally with said inner section and creased along said first hinge axis.

BRIEF DESCRIPTION OF THE DRAWINGS

An embodiment of the present invention will now be described by way of example, with reference to the accompanying drawings in which.

DESCRIPTION OF THE PREFERRED EMBODIMENT

Figure 1:
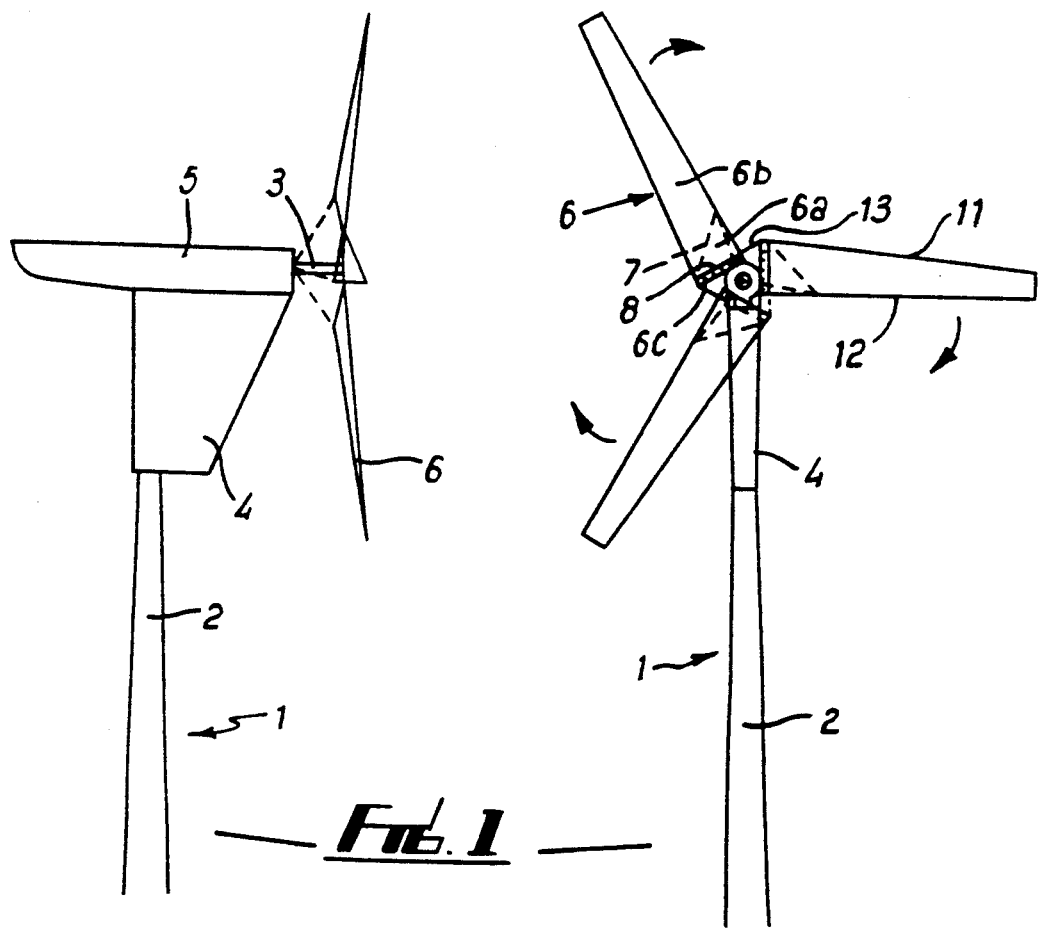
FIG. 1 shows a schematic front and side view of a windmill in accordance with the present invention.
Figure 2:
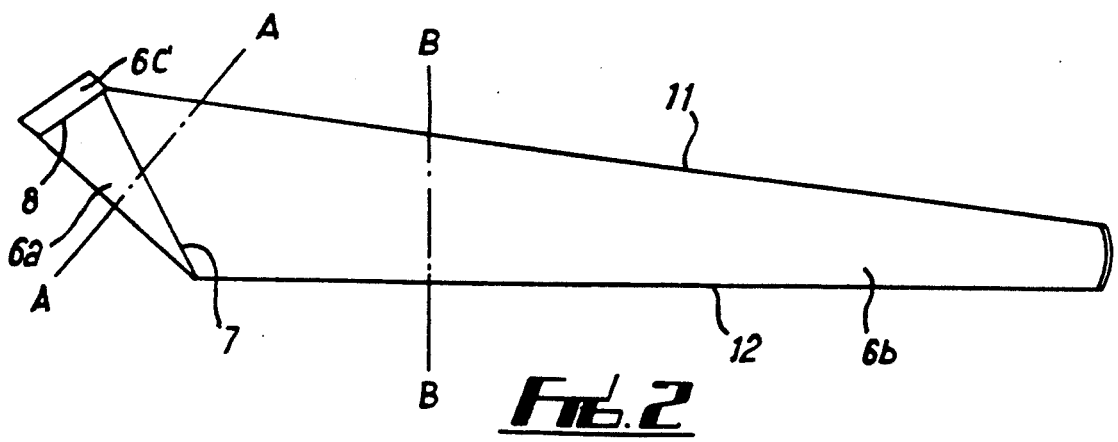
FIG. 2 illustrates a single blade of a windmill in accordance with the present invention.
Figure 3:
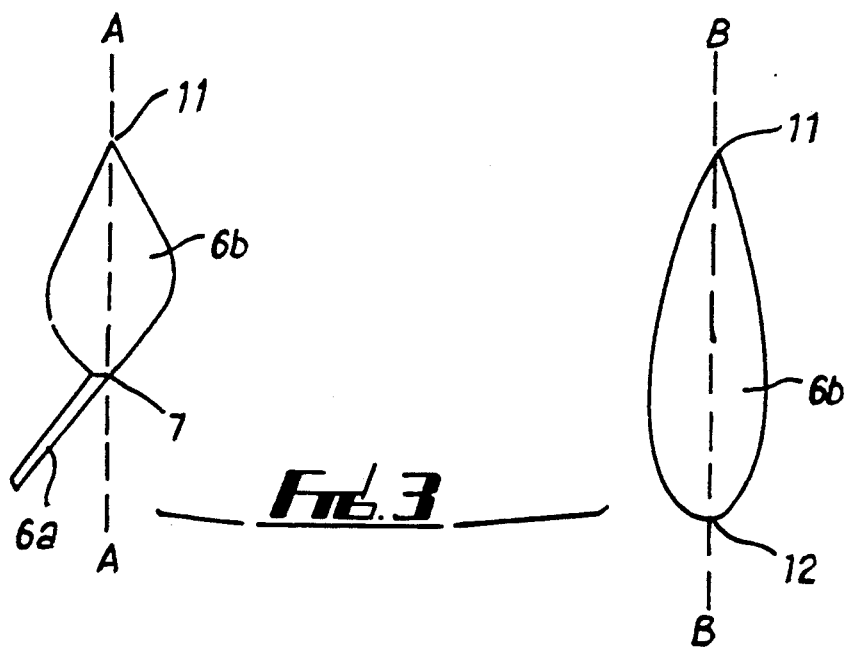
FIG. 3 shows sections A—A and B—B, through the blade of FIG. 2.
Figure 5:
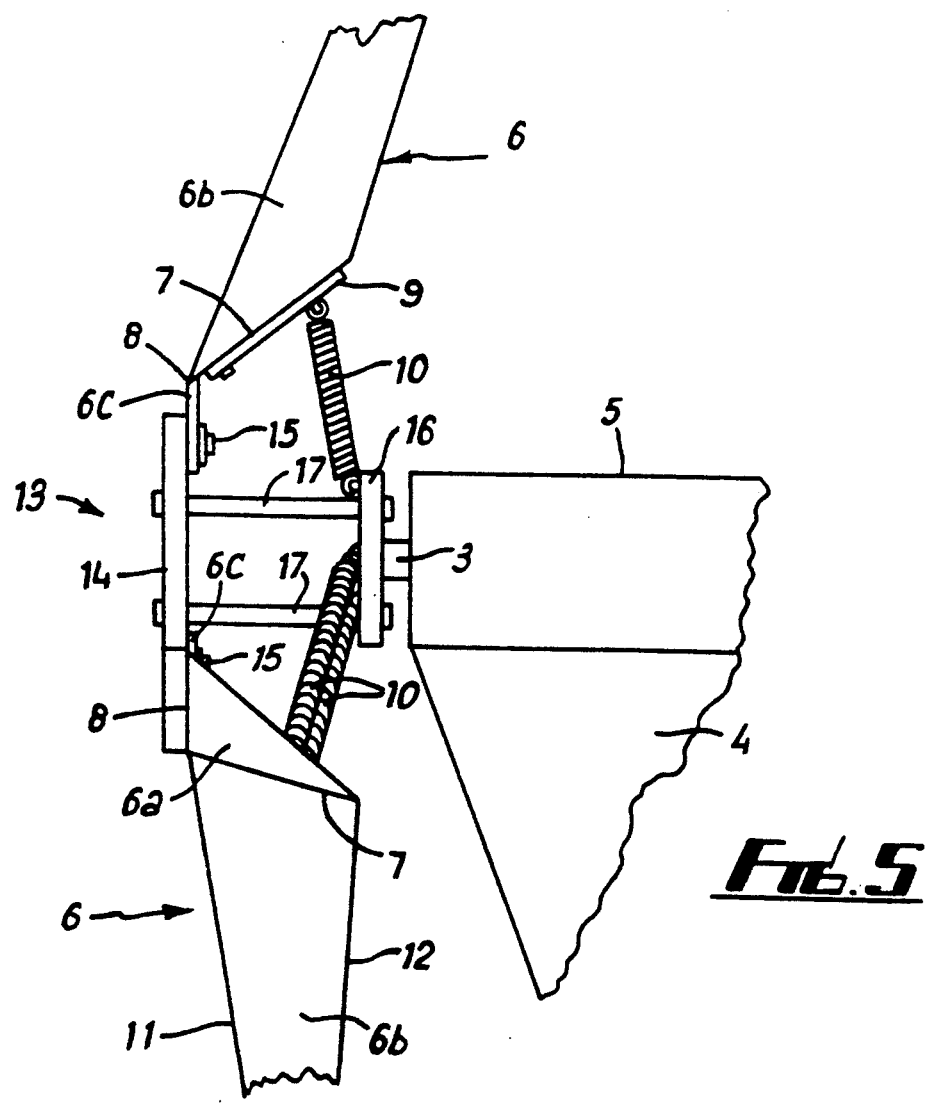
FIG. 5 is a schematic, fragmentary side view of the blades, hub and housing of the windmill of FIG. 4.
Figure 4:
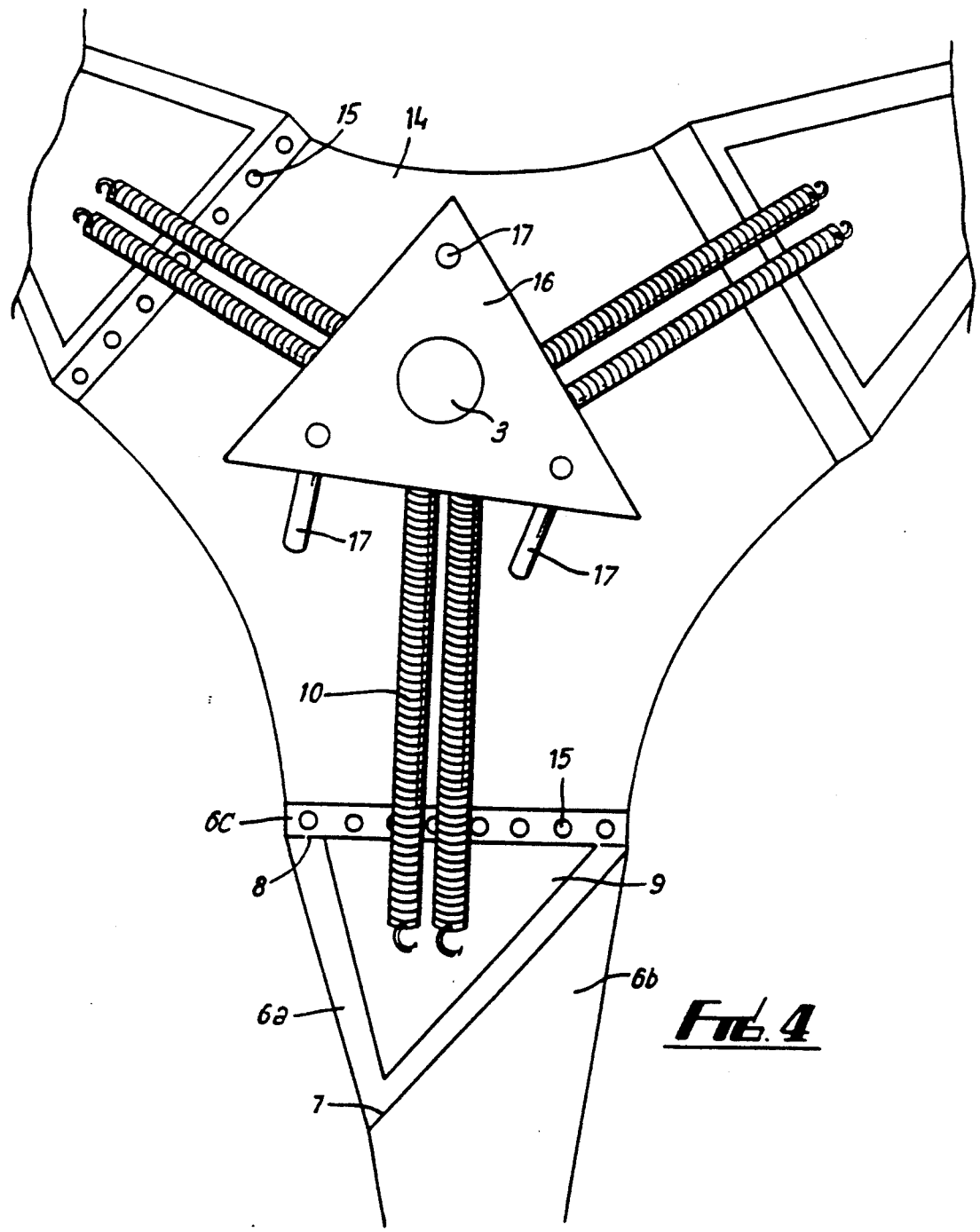
FIG. 4 is a schematic, rear perspective view of the hub and inner blade portions of a windmill in accordance with the invention.

FIG. 1 shows a windmill 1 for generating electricity, having a support post 2 secured to the ground through a base plate, not shown, the post 2 having mounted on it a rotatable director 4 with a tubular housing 5. An electrical generator is mounted within the housing 5 and connected to wiring which runs through the director 4 and post 2 and thence to a location where electricity is required. The rotor of the generator is driven by a rotatable shaft 3 which carries at its end a hub portion 13 from which extend three blades 6. In use the director 4 ensures that the blades 6 are always disposed in a direction for rotation by the wind.

Each windmill blade 6 comprises a generally triangular inner section 6a hingeably connected to the hub 13 along a first hinge axis 8 and an outer section 6b hingeably connected to the inner section 6a along a second hinge axis 7. The inner and outer blade sections 6a and 6b are formed integrally from plastics material creased along the second hinge axis 7. The inner section 6a is secured to a main hub member 14 by means of an integrally formed flap 6C, creased along the first hinge axis 8, which is attached to the hub member 14 by means of bolts, rivets or the like 15.

The creases along the hinge axes 7 and 8 are resilient, biasing the inner section 6a towards a position where it lies in a plane at an angle to the plane of rotation of the blades, extending outwardly and rearwardly from the first hinge axis 8, and biasing the outer section 6b towards a position where it extends outwardly from the axis of rotation of an angle to the plane of the inner section 6a and at a pitch angle to the plane of rotation. The second hinge axis 7 extends from a point on the trailing edge 11 of the blade 6 at the base thereof adjacent the first hinge axis 8 to a point on the leading edge 12 remote from the first hinge axis 8.

In the illustrated embodiment the angle between the two hinge axes in the plane of the inner section 6a is approximately 45°.

The resilience of the creases along the first hinge axes 8 is augmented by resilient bias members, such as coil springs 10, connected between the hub 13 and the inner sections 6a. The coil springs 10 each have a first end connected to an anchoring member in the form of a triangular plate 16, spaced rearwardly from the main hub member 13 along the axis of rotation by rods 17 at each vertex thereof, and a second end connected to a plate 9 attached to the inner surface of each inner section 6a facing the axis of rotation. The anchoring plate 16 also secures the hub 13 to the shaft 3.

Each of the blades is manufactured from a sheet of plastics material such as PVC or high density polyethylene, which is folded into an aerodynamic hollow tear drop shape. The inner section 6a of the blade 6 is formed by gluing the two sides of the material together and the creases along the hinge axes 7 and 8 are produced by heat welding.

The resilience of the creases along the hinge axes 7 and 8 and of the springs 10 biases the blades towards the rest position as described above. As the blades rotate, centrifugal force acting along the longitudinal axes of the blades against the biasing forces tends to reduce the angles between the plane of the inner section 6a and the plane of rotation and between the planes of the inner and outer sections 6a and 6b, so reducing the pitch of the blades. The pitch angle progressively reduces as the wind speed increases, and increases as the wind speed drops. The blades thus respond automatically to variations in wind speed so as to maintain a substantially constant speed of rotation of the blades. The outer blade sections themselves twist through approximately 15° to give progressive stall with increasing wind speed to prevent drop-off of power after optimum wind speed. The design of the blades thus provides constant power with increasing wind speed beyond optimum.

The configuration of the blade, with the second hinge axis extending from the base of the blade on the trailing edge to a point spaced outwards from the base on the leading edge, means that the pitch angle also responds to variations in the torsional load on the shaft, so that the pitch angle increases in response to increased load and reduces in response to decreased load; i.e. the limiting speed of rotation which is maintained by the variation of the blade geometry in response to varying wind speeds increases as the load increases (the limiting speed for no load is less than the limiting speed when a load is applied).

Modifications and improvements may be incorporated without departing from the scope of the invention.

I claim:

1. A windmill including a plurality of windmill blades extending outwardly from and spaced equi-angularly about a central axis of rotation and each having a leading edge and a trailing edge, the blades being connected together at a central hub portion and adapted to rotate about said central axis in a plane of rotation normal to said central axis, each of said blades having an inner section hingeably attached to said hub portion along a first hinge axis and an outer section hingeably connected to said inner portion along a second hinge axis, said second hinge axis extending from a point on the trailing edge of the blade adjacent to the first hinge axis to a point on the leading edge of the blade remote from the first hinge axis, the inner section being resiliently biased towards a rest position wherein it lies in a plane at an angle to the plane of rotation and wherein the outer section is disposed at a pitch angle relative to the plane of rotation, such that force applied to the blade against the bias force tends to reduce the angle between the plane of the inner section and the plane of rotation and the pitch angle of the outer section.

2. A windmill as claimed in claim 1, wherein said hub portion is attached to a rotatable shaft extending rearwardly from the hub along the axis of rotation, and wherein said inner section of each blade is angled outwardly and rearwardly from the hub when in its rest position.

3. A windmill as claimed in claim 1, wherein said inner section of each blade is biased towards its rest position by at least one resilient bias element connected between the hub portion and the inner section.

4. A windmill as claimed in claim 3, wherein said hub portion includes an anchoring member spaced from the first hinge axes along the axis of rotation, said at least one resilient bias member of each blade having a first end connected to the anchoring member and a second end connected to the inner section of the blade.

5. A windmill as claimed in claim 4, wherein said second end of said at least one resilient member of each blade is attached to a plate member secured to an inner surface of the inner section facing the axis of rotation.

6. A windmill as claimed in claim 3, wherein said at least one resilient bias member of each blade comprises a coil spring.

7. A windmill as claimed in claim 1, wherein said inner section of each blade is generally triangular, a first edge thereof extending along said first hinge axis, a second edge thereof extending along said second hinge axis, and a third edge thereof forming part of the leading edge of the blade.

8. A windmill as claimed in 1, wherein the angle between the first and second hinge axes in the plane of the inner section of each blade is approximately 45°.

9. A windmill as claimed in claim 1, wherein said inner and outer sections of each blade are formed integrally from plastics material creased along said second hinge axis.

10. A windmill as claimed in claim 9, wherein each blade is attached to the hub by means of a flap formed integrally with said inner section and creased along said first hinge axis.

* * * * *